US008108375B2

(12) United States Patent
Barsness et al.

(10) Patent No.: US 8,108,375 B2
(45) Date of Patent: Jan. 31, 2012

(54) PROCESSING DATABASE QUERIES BY RETURNING RESULTS OF A FIRST QUERY TO SUBSEQUENT QUERIES

(75) Inventors: Eric Lawrence Barsness, Pine Island, MN (US); Richard Dean Dettinger, Rochester, MN (US); Mark Robert Funk, Mantorville, MN (US); Ross E. Johnson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/351,826

(22) Filed: Jan. 10, 2009

(65) Prior Publication Data

US 2009/0138448 A1 May 28, 2009

Related U.S. Application Data

(63) Continuation-in-part of application No. 10/697,968, filed on Oct. 30, 2003, now abandoned.

(51) Int. Cl.
*G06F 17/30* (2006.01)
(52) U.S. Cl. ........................ 707/705; 707/713; 707/721
(58) Field of Classification Search .................. None
See application file for complete search history.

(56) References Cited

U.S. PATENT DOCUMENTS

| 5,265,065 | A | 11/1993 | Turtle |
| 5,410,715 | A | 4/1995 | Ishimoto et al. |
| 5,666,526 | A | 9/1997 | Reiter et al. |
| 5,671,365 | A | 9/1997 | Binford et al. |
| 5,765,147 | A | 6/1998 | Mattos et al. |
| 6,163,776 | A | 12/2000 | Periwal |
| 6,275,914 | B1 | 8/2001 | Jeddeloh |
| 6,457,020 | B1 | 9/2002 | Carey et al. |
| 6,785,675 | B1 | 8/2004 | Graves et al. |
| 2005/0060292 | A1 | 3/2005 | Day et al. |
| 2006/0074858 | A1 | 4/2006 | Etzold et al. |

*Primary Examiner* — Hung Q Pham
(74) *Attorney, Agent, or Firm* — Martin & Associates LLC; Derek P. Martin

(57) ABSTRACT

Multiple database queries are satisfied with the same data in a manner that assures the data is current and without having to interrogate the database for each query. In a first embodiment, all queries that are received during the processing of a first query after interrogation of the database has begun for the first query are evaluated to determine whether the result set returned for the first query will satisfy the queries received during processing of the first query. If so, the result set returned for the first query is used to generate result sets for the subsequent compatible queries received during the processing of the first query. In a second embodiment, queries are delayed and grouped, and a new query is then processed for each group that returns a result set that satisfies all of the queries in the group. In both cases, the result set for one query is used to generate a result set for a different query.

6 Claims, 4 Drawing Sheets

Select * from Table1 where C1 4 AND (C2>6 OR C3!=8)

US 8,108,375 B2

PROCESSING DATABASE QUERIES BY RETURNING RESULTS OF A FIRST QUERY TO SUBSEQUENT QUERIES

CROSS-REFERENCE TO PARENT APPLICATION

This patent application is a continuation-in-part of U.S. Ser. No. 10/697,968 filed on Oct. 30, 2003, which is incorporated herein by reference.

BACKGROUND OF THE INVENTION

1. Technical Field

This invention generally relates to computer systems, and more specifically relates to apparatus and methods for accessing data in a computer database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result, which is also known as a "result set".

Some queries take a relatively long time to process. In many computer systems, long queries are common and thus are frequently processed. In the prior art, each query is typically processed individually as it is received. Some prior art database systems recognize that the result set from one query may satisfy a subsequent query, so the result set that satisfies the query is cached for future use. When a subsequent query needs the same data, it can pull the data out of the result set in the cache rather than performing the lengthy query by interrogating the database. The problem with this approach is that the data in the cache may be stale, which means the underlying data in the database may have changed. If this happens, delivering the cached result set will result in stale data being delivered to the subsequent query. In some environments, data staleness may not be an issue. This may be due to infrequent updates that mean cached data is almost always accurate, or because the overhead of keeping the cached data current is more than the impact of using stale data. However, in many applications that rely on accurate real-time data, such as airline reservation systems, returning stale data is not acceptable. Thus, to assure the data is fresh, caching of query results is disabled, and each query must be individually processed by interrogating the database for each query. This individual processing of the same or similar queries is inefficient and reduces system performance. Without a way to process multiple queries in a way that assures the data is current for all the queries and in a way that eliminates the processing time for one or more queries, the computer industry will continue to suffer performance penalties when executing database queries.

DISCLOSURE OF INVENTION

According to the preferred embodiments, multiple database queries are satisfied with the same data in a manner that assures the data is current and without having to interrogate the database for each query. In a first embodiment, processing of a first query commences, and all queries that are received during the processing of the first query are evaluated to determine whether the result set returned for the first query will satisfy any of the subsequent queries that are received during processing of the first query. If so, the result set returned for the first query is used to generate result sets for the subsequent compatible queries received during the processing of the first query. In a second embodiment, queries are queued up, and a new query is then generated and processed for each group of compatible queries that will return a result set that satisfies all of the queries in the group. In both cases, the result set for one query is used to generate a result set for one or more other queries, so the result set may be used to satisfy these grouped queries without the overhead of interrogating the database for each of the grouped queries.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to processing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, let's assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

Figures 2, 3:
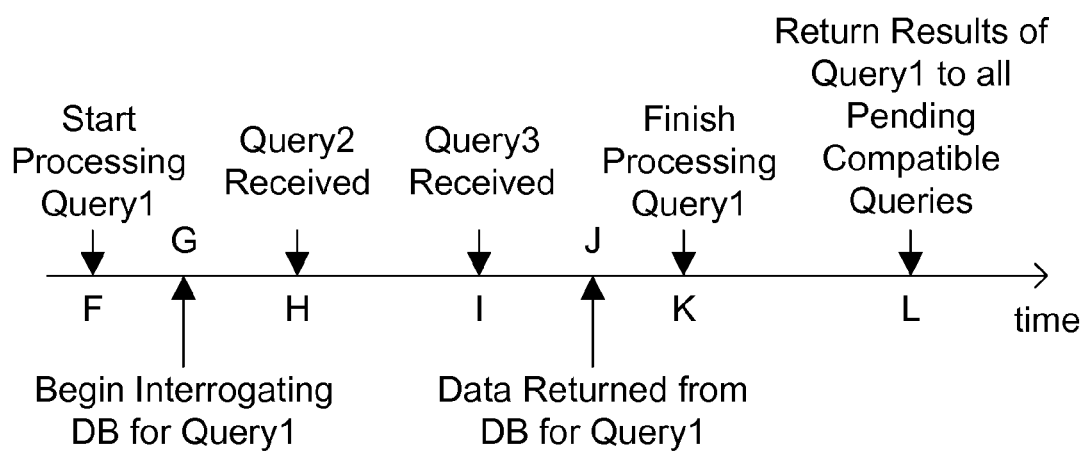
FIG. 2 is a sample database query in Structured Query Language (SQL)
FIG. 3 is a timeline of operations for one specific example in accordance with the first embodiment.

One popular way to define a query uses Structured Query Language (SQL). SQL defines a syntax for generating and processing queries that is independent of the actual structure and format of the database. One sample SQL query is shown in FIG. 2. The "select *" statement tells the database query processor to select all columns, the "from Table1" statement identifies which database table to search, and the "where" clause specifies one or more expressions that must be satisfied for a record to be retrieved. Note that the query of FIG. 2 is expressed in terms of columns C1, C2 and C3. Information about the internal storage of the data is not required as long as the query is written in terms of expressions that relate to values in columns from tables. For the query of FIG. 2, the "where" clause specifies that the first column has a value equal to four (C1=4) logically ANDed with the expression that the second column is greater than six OR the third column is not equal to eight.

In some prior art systems, each query is individually processed by interrogating the database. However, in many systems a query may be run a large number of times, resulting in processing time that is spent repeatedly interrogating the database each time the query is processed. To address this issue, the prior art has incorporated caching that stores the result set for a query, and can deliver the result set for subsequent queries that are satisfied by the result set. The problem with caching relates to data currency. The data in the cache may be stale, which means that stale data may be returned from the cache when the same query comes up again. In many environments, the data must be fresh (i.e., up to date), so caching of query results is not allowed. In such systems, the prior art must individually process each query by interrogating the database, even if it is identical to a query that was just executed. This results in substantial overhead that is spent in interrogating the database for each individual query. An alternative method of dealing with staleness is for the database to track cached pages, and when records in the database are modified, these changes are "pushed" to the cache, or the cached page is invalidated so the query must be regenerated by interrogating the database.

The preferred embodiments provide a way for the results of one query to be used to satisfy multiple queries without having the issues of data staleness that arise when caching query results. Examples in accordance with the preferred embodiments are described in detail below.

2.0 Detailed Description

The preferred embodiments provide a way to use the result set of a single query to satisfy multiple queries in a manner that assures currency of the data without having to interrogate the database for each query and without having to manage any database cache. The result is a substantial increase in performance and system capacity due to the ability to reduce the number of queries that must interrogate the database to return a result set.

Figure 1:
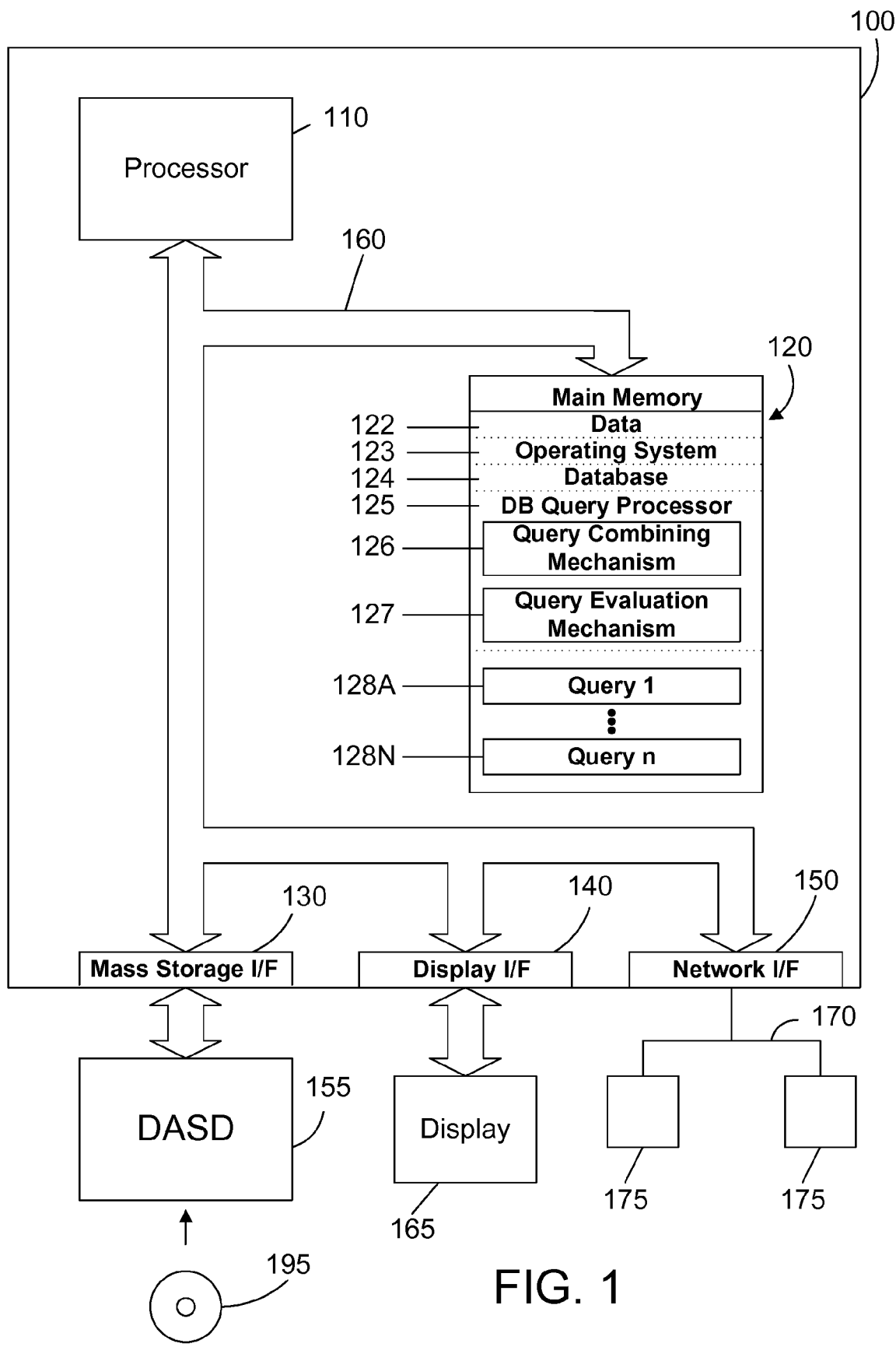
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD RW drive, which may store data to and read data from a CD RW 195.

Main memory 120 in accordance with the preferred embodiments contains data 122, an operating system 123, a database 124, a database query processor 125, and one or more queries 128, shown in FIG. 1 as 128A . . . 128N. Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Database 124 is any suitable database, whether currently known or developed in the future. Database query 128 is a query in a format compatible with the database 124 that allows information stored in the database 124 that satisfies the database query 128 to be retrieved. Database query processor 125 processes queries 128, and allows using the result set from one query to satisfy multiple queries in certain circumstances. Database query processor 125 includes a query combining mechanism 126 and a query evaluation mechanism 127. The query combining mechanism 126 determines whether multiple queries may be grouped into groups of compatible queries, and if so, generates a new query for each group that will produce a result set that satisfies the queries in the group. The query evaluation mechanism 127 evaluates a query to see if it is compatible with other queries. In the context of the first embodiment, a second query is compatible with a first query that is currently being processed if the result set that will be returned to the first query contains all the data needed by the second query (i.e., will "satisfy" the second query). In the context of the second embodiment, the query evaluation mechanism 127 evaluates multiple queries, which allows the database query processor 125 to create one or more groups of compatible queries, and to generate a new query for each group that satisfies all queries in the group. The database query processor 125 enhances system performance by using the result set of a query to satisfy multiple queries, thereby reducing the number of times the database query processor 125 must interrogate the database 124 to generate query results.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, database 124, database query processor 125, and queries 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links.

A first embodiment of the present invention determines whether queries that are received during processing of a first query may be satisfied with the result set of the first query. If so, the result set of the first query is used to generate a result set for the multiple queries without interrogating the database and without caching. Two different representations in accordance with the first embodiment are shown in FIGS. 3 and 4.

FIG. 3 shows a timeline of events in one specific example in accordance with the first embodiment. The database query processor (125 in FIG. 1) begins processing a query denoted Query1 in FIG. 3 at time F. Note that the database query processor does not finish processing Query1 until time K. However, after the interrogating of the database for Query 1 has begun at time G, while the database query processor is processing Query1, two other queries are received, Query2 at time H and Query3 at time I. In the first embodiment, the database query processor determines whether Query2 and Query3 are compatible with Query1. Query2 is compatible with Query1 if the result set returned for Query1 also satisfies Query2, which means that the result set for Query1 contains all data needed by Query2. Similarly, Query3 is compatible with Query1 if the result set returned for Query1 also satisfies Query3. The data is for Query 1 is returned from the database at time J. Processing for Query1 is finished at time K. After the database query processor is finished processing Query 1 at time K, the results of Query1 are returned to Query1 and are used to generate result sets for the other pending queries. Thus, if Query2 and Query3 are both compatible with Query1, the result set for Query1 will be returned to Query1, and will be used to generate the result sets for Query2 and Query3, which will be returned at time L. If Query 2 is compatible but Query 3 is not, the result set for Query1 will be returned to Query1 and will be used to generate the result set for Query2. In this case, the result set for Query2 will be returned at time L, and Query3 will be queued for later processing by the database query processor interrogating the database. While the data for Query1 is returned from the database at time J in FIG. 3, and the time to finish processing Query1 is shown at a later time K, it is possible that returning the data from the database at time J may also corresponding to the end of processing Query1. In addition, while the start of processing Query1 is shown at time F, and the time to begin interrogating the database for Query1 is shown at a later time G, it is possible that the start of processing Query1 at time F may also correspond to the beginning of interrogating the database for Query1.

Figure 4:
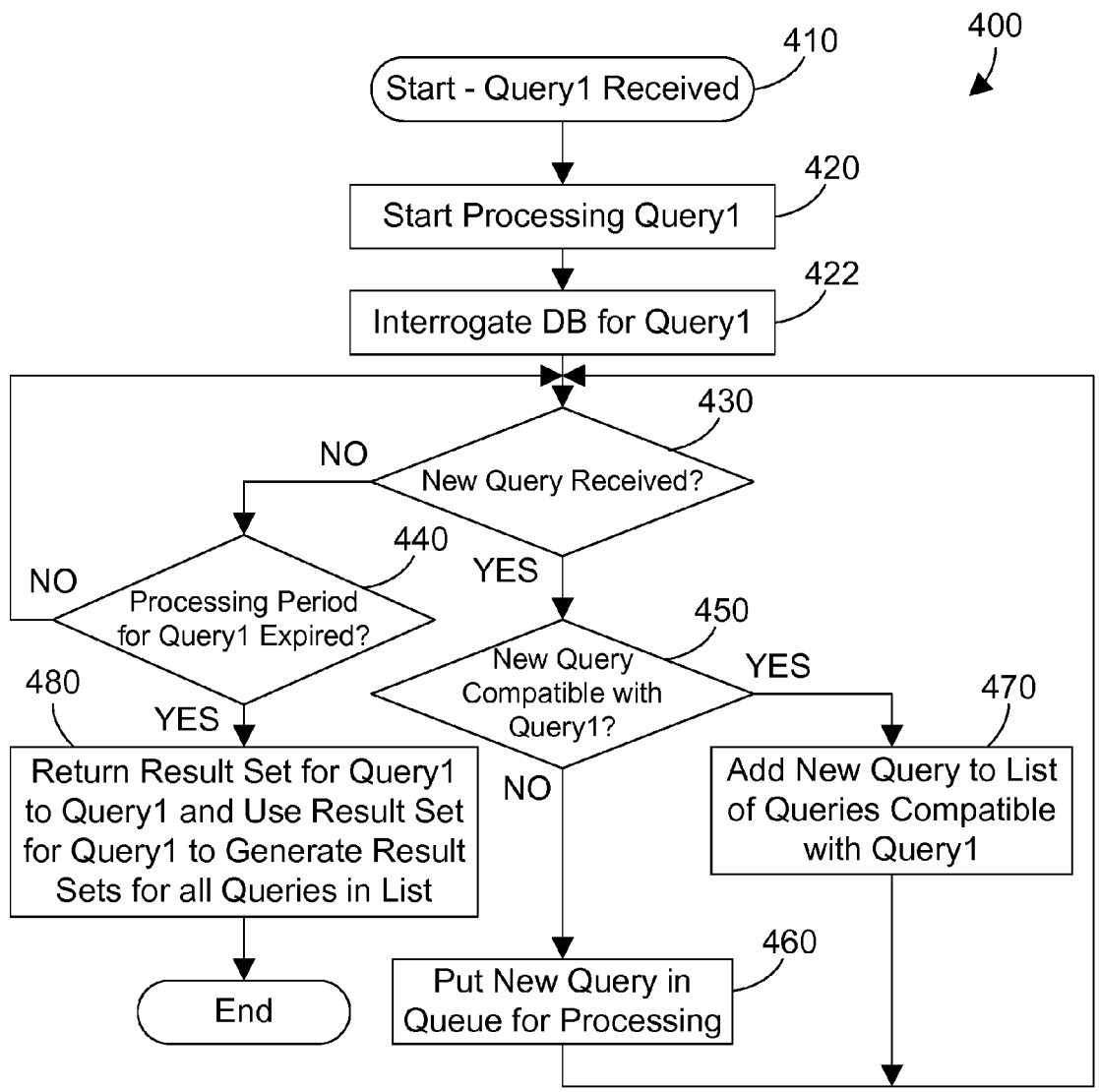
FIG. 4 is a flow diagram of a method in accordance with the first embodiment.

The flow diagram in FIG. 4 shows a method 400 in accordance with the first embodiment. Method 400 begins when Query1 is received (step 410). The database query processor then begins processing Query1 (step 420). The query processor then interrogates the database for Query1 (step 422). Method 400 now waits to see if any additional queries are received (step 430) and monitors a predefined processing period for Query1 to see when the processing period for Query1 expires (step 440). While no new queries are received (step 430=NO) and the processing period for Query1 has not expired (step 440=NO), method 400 will continue to loop. When a new query is received during the processing period for Query1 (step 430=YES), the new query is checked for compatibility with Query1. If the new query is not compatible with Query1 (step 450=NO), the new query is put in the queue for processing by the database query processor (step 460). If the new query is compatible with Query1 (step 450=YES), the new query is added to a list of queries that are compatible with Query1 (step 470), and control passes back to step 430. Once the processing period for Query1 expires (step 440=YES), the result set for Query1 is returned to Query1, and is used to generate result sets for all queries in the list without interrogating the database (step 480). For the specific example in FIG. 3, step 420 is performed at time F. Query2 is then received (step 430=YES). Assuming Query2 is compatible with Query1 (step 450=YES), Query2 is added to the list of queries that are compatible with Query1 (step 470). Method 400 now returns to step 430. We assume that method 400 idles in the loop defined by step 430=NO, step 440=NO until the next query, Query3 is received at time H in FIG. 3. Query3 is a new query, so step 430=YES. Let's assume that Query3 is not compatible with Query1 (step 450=NO). Query3 is thus added to the queue for processing by the database query processor (step 460). Method 400 then loops back to step 430 and continues to idle in the loop defined by step 430=NO, step 440=NO until the processing period for Query1 expires (step 440=YES). In the most preferred implementation, the processing period for Query1 expires in step 440 when the database query processor finishes processing Query1, as shown at time I in FIG. 3. At this point, the result set for Query1 is returned to Query1, and is used to generate a result set for each query in the list, namely Query2 (step 480). The result is that current data is returned in the result set for Query2 without the need of interrogating the database for Query2. Note that Query3 was incompatible in this specific example, so Query3 will be processed separately by the database query processor.

In the first embodiment, the database query processor 125 in FIG. 1 preferably performs method 400 in FIG. 4. The query evaluation mechanism 127 in FIG. 1 preferably performs step 450 in FIG. 4.

The FIGS. 3 and 4 show the simple case when a single query Query1 is being processed when other queries are received. In many database systems, multiple queries may be processed concurrently. Thus, in another example, the database query processor could begin processing Query1 at time F in FIG. 3, and could begin processing Query2 immediately upon receipt of Query2 at time G. In this case, when Query3 is received, it could be checked for compatibility with both Query1 and Query2, and could be grouped with either of those currently-executing queries. In this case, where the database is currently executing both Query1 and Query2, step 450 in FIG. 4 could be expanded to see if the new query, Query3 in FIG. 3, is compatible with either of Query1 and Query2, and if so, Query3 is grouped in step 470 with the currently-executing query that is compatible. If the new query is not compatible with any of the currently-executing queries (step 450=NO), the new query is placed on the queue for processing (step 460). In this manner, each query that is received is checked for compatibility with all currently-executing queries.

A simple example is now presented to illustrate the first embodiment using the timeline of FIG. 3 and the method of FIG. 4. We assume the following:

Query1: select * from Table1 where C1=4

Query2: select * from Table1 where C1=4 AND C2>6

Query3: select * from Table1 where C1=4 AND C3!=8

When method 400 starts processing Query1, it determines that the result set will be all records from Table1 where column 1 (C1) has a value of four. Now, when Query2 is received, step 450 in FIG. 4 determines that Query2 is compatible with Query1 because the result set from Query1 (all records from Table1 where C1=4) includes the data needed by Query2, because Query2 further narrows the data of interest by the term AND C2>6 in the "where" clause. In addition, when Query3 is received, step 450 in FIG. 4 determines that Query3 is compatible with Query1 because the result set from Query1 (all records from Table1 where C1=4) includes the data needed by Query3. As a result, the result set for Query1 (all records from Table1 where C1=4) may be returned as the result set for Query1, and may be used to generate result sets of Query2 and Query3 without interrogating the database. Note that the database query processor 125 will remove the non-relevant data in the result set for each of Query2 and Query3 before returning the final result set to the queries. The key is that the result set of Query1 was used in generating the result set of Query2 and Query3 without interrogating the database. The result is a substantial increase in performance and system capacity in processing database queries.

Figure 5:
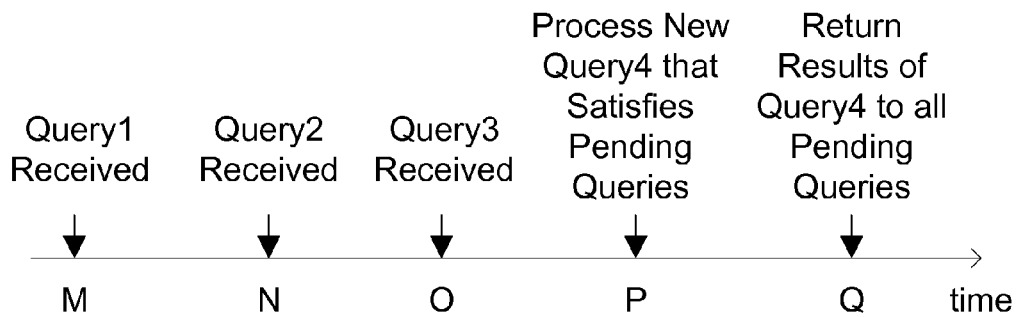
FIG. 5 is a timeline of operations for one specific example in accordance with the second embodiment.
Figure 6:
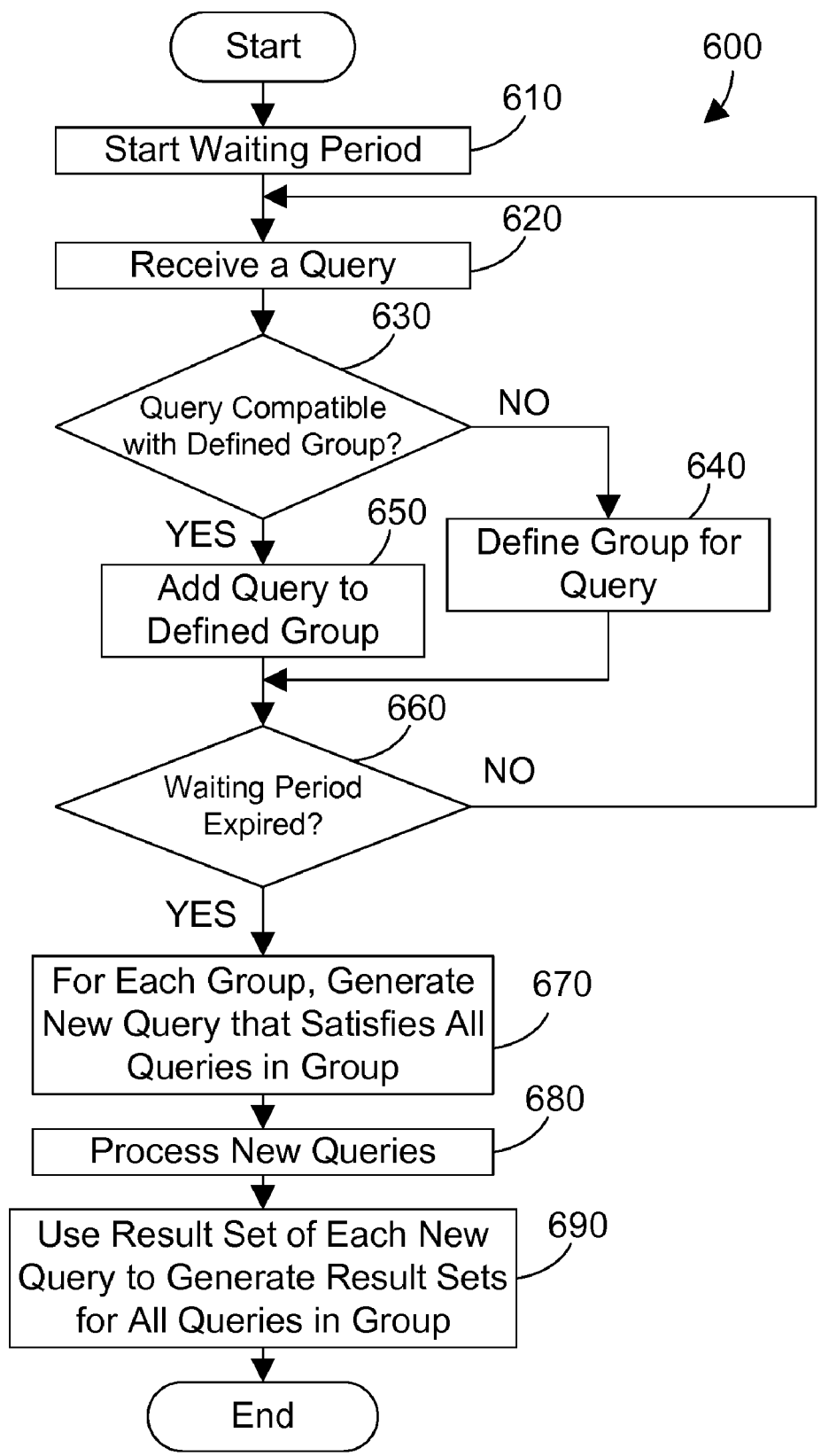
FIG. 6 is a flow diagram of a method in accordance with the second embodiment.

A second embodiment of the present invention receives a query, but delays processing the query while collecting other queries for some waiting period. Once the waiting period has expired, the database query processor analyzes the waiting queries, groups compatible queries together, and generates a new query for each group that will return a result set that will contain the data needed by all of the queries in that group. Two different representations in accordance with the second embodiment are shown in FIGS. 5 and 6. FIG. 5 shows a timeline of events in accordance with the second embodiment. A first query Query1 is received at time M. Processing of Query1 does not start immediately, but is delayed. Later, Query2 is received at time N. Later still, Query3 is received at time O. Note that the database query processor has still not started processing any of these three received queries. Next, the database query processor analyzes Query1, Query2 and Query3, and generates a new query Query4 that will return a result set that satisfies all three pending queries. Processing of Query4 begins at time P. Once processing of Query4 is complete, the result set for Query4 is used to generate the result sets for Query1, Query2 and Query3 without interrogating the database. Because Query4 was generated to retrieve all data needed by all three queries, we know that the result set for Query4 will contain all the required data for all of these queries.

The flow diagram in FIG. 6 shows a method 600 in accordance with the second embodiment. Method 600 begins by starting a waiting period (step 610). For each query received during the waiting period (step 620), method 600 determines whether the received query is compatible with a defined group of queries (step 630). If not (step 630=NO), the a group for the query is defined (step 640). If the query is compatible with a defined group (step 630=YES), the query is added to that group (step 650). If the waiting period has not expired (step 660=NO), method 600 returns to step 620 to wait for more queries to be received. Once the waiting period expires (step 660=YES), a new query is generated for each group that satisfies all queries in the group (step 670). The new queries are then processed (step 680), and the result set for each new query is used to generate result sets for all queries in the group (step 690).

Note that the waiting period can be specified in any suitable manner. For example, the waiting period could be a predefined period of time, such as five seconds. All queries that are received during the five-second window would be delayed. In the alternative, the waiting period could be a predefined number of some other increment, such as processor cycles. Another alternative is to specify the waiting period as a function of the number of received queries. For example, if the waiting period is defined to be five queries, method 660 will wait until it has received five queries before generating a new query that will return a result set that may be used by all five. In addition, the waiting period could be defined by any suitable heuristic.

If we correlate the events in the timeline in FIG. 5 with the method 600 in FIG. 6, we start the waiting period in step 610 either upon receipt of Query1, or before the receipt of Query1. We assume the waiting period extends to some time between time O and time P on the timeline in FIG. 5. When Query1 is received in step 620, it checks to see if Query1 is compatible with a defined group. At this point in time, we assume that no defined group exists (step 630=NO), so a group is defined that includes Query1 (step 640). The waiting period has not expired (step 660=NO), so method loops back to step 620 where Query2 is received. Now Query2 is checked for compatibility with a defined group (step 630). The only defined group at this point in time is the group that includes Query1. We assume for this example that Query2 is compatible with the defined group that includes Query1 (step 630=YES), so Query2 is added to the group (step 650). The waiting period has still not expired (step 660=NO), so method 600 loops back to step 620, where Query3 is received. We assume for this example that Query3 is also compatible with the group that includes Query1 and Query2 (step 630=YES), so Query3 is added to that group (step 650). At this point the waiting period expires (step 660=YES). A new query Query4 is generated for the defined group that will satisfy all of Query1, Query2 and Query3 (step 670). Query4 is then processed (step 680), and the result set returned from the new query is used to generate result sets for each of Query1, Query2 and Query3 (step 690). In this manner, the database query processor only has to perform one access to the database in processing Query4, and yet can satisfy all of the three pending queries Query1, Query2 and Query3 with the result set of Query4. The result is a significant reduction in database accesses in processing queries, resulting in enhanced system performance. Note that the grouping of queries may be done by method 600 checking each query against a set of criteria that determines whether a received query is compatible with a defined group. In the alternative, an application could group queries together, so the compatibility in step 630 would be determined by whether the received query is assigned to a group.

Note that some queries may not be delayed based on historical data. For example, queries can be tracked to determine if some are too unique to be useful to other queries. If so, the processing of these queries will not be delayed. Alternatively, application developers may select certain queries to be processed using method 600 because they know there will be a benefit.

In the second embodiment, the database query processor 125 in FIG. 1 preferably performs method 600 in FIG. 6. The query combining mechanism 126 in FIG. 1 preferably performs step 640 in FIG. 6.

A simple example is now presented to illustrate the second embodiment for the timeline of FIG. 5 and the flow diagram of FIG. 6. We assume the following:

Query1: select * from Table1 where C1=4 AND
    (C2>6 OR C3!=8)

Query2: select * from Table1 where C1=4 AND C2>6

Query3: select * from Table1 where C1=4 AND
    C3!=8

We assume for this example that the waiting period is set so that these three queries Query1, Query2 and Query3 are received during the waiting period, and are therefore added to the list in step 620. We assume that the waiting period then expires (step 630=YES). Step 640 then generates a new query Query4 that satisfies all queries in the list. Thus, for the simple example above, the resulting Query4 could be:

Query4: select * from Table1 where C1=4

Query4 is processed in step 650, which generates a result set of (all records in Table 1 where C1=4). This result set is then used by the database query processor to generate the result sets for Query1, Query2 and Query3 without the need of interrogating the database. The result is a substantial increase in performance in processing database queries.

The preferred embodiments provide a way for a query processor to use the result set of one query to satisfy multiple pending queries, thereby eliminating some accesses to the database. In the first embodiment, while a first query is being processed, the database query processor evaluates incoming queries to determine whether they are compatible with the first query (i.e., can be satisfied with the result set from the first query). If so, the result set of the first query is returned to the first query, and is used to generate a result set for each pending query that is compatible with the first query. In the second embodiment, queries are delayed for some period of time, and a new query is then generated that will have a result set that satisfies all of the delayed queries. In this manner, both embodiments succeed at reducing the number of accesses to the database that are required in processing queries without the threat of stale data that arises when query results are cached.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
    at least one processor;
    a memory coupled to the at least one processor;
    a database residing in the memory; and
    a database query processor residing in the memory and executed by the at least one processor, the database query processor processing a first query to the database by interrogating the database to generate a first result set, and after interrogating the database has begun while processing the first query, evaluating at least one other query that is received during the processing of the first query to determine whether the at least one other query is satisfied by the first result set, returning the first result set to the first query, using the first result set to generate at least one other result set for any of the at least one other query that is satisfied by the first result set without caching the first result set and without interrogating the database, and returning the generated at least one other result set to the at least one other query that is satisfied by the generated at least one other result set.

2. The apparatus of claim 1 wherein the database query processor delays processing a plurality of received queries, groups compatible received queries together, generates a new query for each group that will produce a result set that will satisfy all queries in the group, processes each new query, and generates from the result set of each new query at least one other result set for queries in the group corresponding to the new query.

3. A method for processing a plurality of database queries, the method comprising the steps of:
    processing a first query to a database by interrogating the database to generate a first result set;
    after interrogating the database has begun while processing the first query by a computer system, evaluating at least one other query that is received during the processing of the first query to determine whether the at least one other query is satisfied by the first result set; returning the first result set to the first query;

using the first result set to generate at least one other result set for any of the at least one other query that is satisfied by the first result set without caching the first result set and without interrogating the database; and returning the generated at least one other result set to the at least one other query that is satisfied by the generated at least one other result set.

4. The method of claim 3 further comprising the steps of:

delaying processing a plurality of received queries; grouping compatible received queries together;

generating a new query for each group that will produce a result set that will satisfy all queries in the group;

processing each new query; and generating from the result set of each new query at least one other result set for queries in the group corresponding to the new query.

5. A program product comprising:

(A) a database query processor that processes a first query to the database by interrogating the database to generate a first result set, and after interrogating the database has begun while processing the first query, evaluates at least one other query that is received during the processing of the first query to determine whether the at least one other query is satisfied by the first result set, returns the first result set to the first query, uses the first result set to generate at least one other result set for any of the at least one other query that is satisfied by the first result set without caching the first result set and without interrogating the database, and returning the generated at least one other result set to the at least one other query that is satisfied by the generated at least one other result set; and (B) recordable media bearing the database query processor.

6. The program product of claim 5 wherein the database query processor delays processing a plurality of received queries, groups compatible received queries together, generates a new query for each group that will produce a result set that will satisfy all queries in the group, processes each new query, and generates from the result set of each new query at least one other result set for queries in the group corresponding to the new query.

* * * * *